March 31, 1925. 1,531,393

E. GYSEL

LOCOMOTIVE

Filed Sept. 3, 1924

Inventor:
Ernst Gysel,
By James H Hamilton,
his Attorney.

Patented Mar. 31, 1925.

1,531,393

UNITED STATES PATENT OFFICE.

ERNST GYSEL, OF WINTERTHUR, SWITZERLAND, ASSIGNOR TO SCHWEIZERISCHE-LO-KOMOTIV- UND MASCHINENFABRIK, OF WINTERTHUR, SWITZERLAND, A CORPORATION OF SWITZERLAND.

LOCOMOTIVE.

Application filed September 3, 1924. Serial No. 735,655.

*To all whom it may concern:*

Be it known that I, ERNST GYSEL, a citizen of the Swiss Confederation, and residing at Winterthur, Switzerland, have invented certain new and useful Improvements in Locomotives, of which the following is a specification.

This invention relates to chassis-frames for locomotives with single-axle drive. In locomotives with single-axle drive and toothed wheels located outside the driving wheels the toothed wheels are supported by separate parts which are connected with the plates of the main frame. Heretofore these separate parts have been so constructed and arranged that the shaft of each toothed wheel associated with a driving wheel is mounted in a special cast steel bracket which is provided for only this one gear wheel and was bolted to the main-frame plates. This known construction has certain defects which are chiefly due to the steel castings being of a complicated shape involving considerable cost and weight. In addition, in this known construction the main-frame plates must be so strong as to be able to carry reliably the overhanging cast steel bracket together with the heavy toothed wheel mounted on the frame, for in this known construction the main frame is weakened by the attachment of the individual cast steel brackets, one for each driving wheel, and in addition is severely loaded by the weight of these brackets.

This invention has for its object to obviate these drawbacks.

An important feature of the invention consists in arranging an auxiliary frame parallel to the main-frame plates outside the driving wheels and toothed wheels, which auxiliary frame is so connected in a very simple manner with the main frame by transverse and longitudinal bracing members that it forms with the same a structure in the form of a closed beam whereof the resistance to bending stresses acting both vertically and horizontally is materially greater than that of the known arrangement comprising individual cast-steel brackets. The main frame can consequently be made lighter than heretofore. In addition, the heavy and costly cast-steel brackets are dispensed with and can be replaced by light bearing brackets and bracing members which can be conveniently attached to the main-frame plates.

Figure 1:
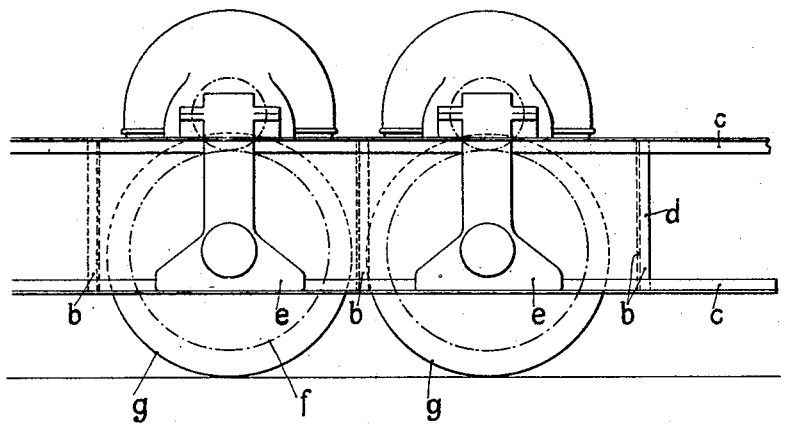
Figure 2:
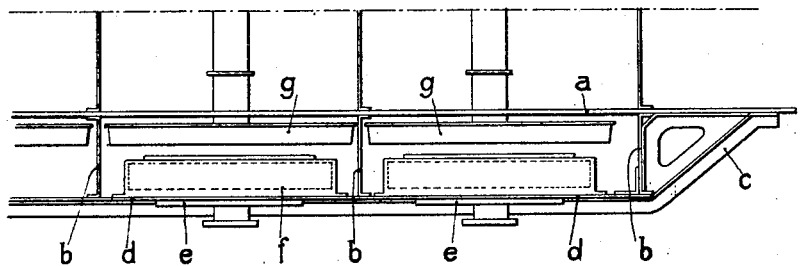

One form of chassis frame according to the invention is diagrammatically illustrated by way of example in Figures 1 and 2 of the accompanying drawing in side elevation, and plan view, respectively.

Referring to the drawing, an auxiliary frame $d$ is mounted on the outside of a main frame $a$ by means of transverse bracing members $b$ and longitudinal bracing members $c$. This auxiliary frame $d$ is provided with bearing brackets $e$ for the axles of toothed wheels $f$ situated outside the driving wheels $g$. Owing to the said transverse and longitudinal bracing members this auxiliary frame $d$ forms with the main frame a closed structure constituting a beam and in this manner serves to stiffen the same vertically and horizontally.

I claim:—

1. In a locomotive chassis-frame for single-axle drive, the combination with a main frame having outside the same driving wheels and toothed wheels associated therewith, of an auxiliary frame situated parallel with the main frame and outside the toothed wheels, and transverse and longitudinal bracing members so connecting the auxiliary frame with the main frame that they constitute a structure in the form of a beam, which auxiliary frame increases the resistance to bending stresses of the main frame in a vertical and horizontal direction, substantially as described.

2. In a locomotive chassis-frame for single-axle drive, the combination of a longitudinal main frame, an auxiliary frame situated parallel therewith and braced transversely and longitudinally thereto outside the same to form therewith a closed beam, bearing brackets on said auxiliary frame, wheel axles arranged transversely of said main frame and journaled in said brackets and in the main frame, and driving wheels and toothed wheels associated therewith on said axles between the main and auxiliary frames, substantially as described.

ERNST GYSEL.